United States Patent Office 3,632,562
Patented Jan. 4, 1972

3,632,562
PROCESS FOR POLYMERIZING AND COPOLYMERIZING VINYL CHLORIDE IN AQUEOUS EMULSIONS
Gerhard Beier, Joseph Heckmaier, and Johann Bauer, Burghausen, Upper Bavaria, Germany, assignors to Wacker-Chemie G.m.b.H., Munich, Bavaria, Germany
No Drawing. Filed July 7, 1967, Ser. No. 651,666
Claims priority, application Germany, July 8, 1966, W 41,973
Int. Cl. C08f 1/13, 3/30
U.S. Cl. 260—78.5 BB          2 Claims

ABSTRACT OF THE DISCLOSURE

This invention relates to polymerizing and copolymerizing vinyl chloride in aqueous emulsions, and it has for its object to provide a novel and improved process for this purpose.

In particular, the invention concerns the making of pastable polymerizates of vinyl chloride or of pastable copolymerizates containing at least 80 weight perecnt of polyvinyl chloride, i.e. of vinyl chloride polymerizates or vinyl chloride copolymerizates which can be dispersed in softeners, perhaps using at the same time organic thinners which either do not dissolve or swell the polymerizates at all or only a little, forming pastes or platisols or organosols, by polymerizing or copolymerizing the vinyl chloride in an aqueous emulsion, i.e. by the polymerization or copolymerization of vinyl chloride which is dispersed in water by means of emulsifiers.

BACKGROUND OF THE INVENTION

One known process of the kind referred to above uses, for emulsifiers, water-soluble salts of aliphatic saturated monocarboxylic acids which are branched in alpha-position to the carboxyl group and which contain a minimum of 8 carbon atoms per molecule. The polymerizates obtained by this known method have a better thermal stability than polymerizates made with many other emulsifiers, but they yield pastes which exhibit an unsatisfactorily high viscosity and a dilating flow, i.e. their viscosity increases with the increasing effect of shearing forces.

It is also known how to polymerize or copolymerize vinyl chloride in an aqueous emulsion, using a polymerizate seed latex. According to the prevailing opinion of the experts it was essential there to see to it that at any time during the polymerization not more emulsifier is present than what is necessary to completely cover the surface of the available polymerizate particles with a monomolecular layer. It has been discovered that the use of these known methods for the polymerization of vinyl chloride in an aqueous emulsion, using a polymerizate seed latex and the above-mentioned salts of branched carboxylic acids for emulsifiers results in an undesirable coagulation of the polymerizate dispersion during or immediately after the polymerization.

SUMMARY OF THE INVENTION

The present invention provides a process for the polymerization and copolymerization of vinyl chloride in an aqueous emulsion not only avoids the above-mentioned undesirable coagulation, but furthermore yields polymerizates which are thermally stable or which can easily be thermally stabilized. They also result in pastes which besides a low viscosity and good storage properties show a Newtonian or largely Newtonian flow property which is very desirable for processing, i.e. whose viscosity is not influenced or is influenced only slightly by the effect of shearing forces.

The invention provides a process for polymerizing and copolymerizing vinyl chloride in an aqueous emulsion, using a polymerizate seed latex, and in the presence of water-soluble salts of aliphatic saturated monocarboxylic acids which are branched in alpha positions to the carboxyl group and have at least 8 carbon atoms per molecule—for emulsifiers. And the process is characterized by the fact that at the beginning of the polymerization of the monomers to be polymerized in the presence of the polymerizate seed latex, 0.1 to 1 weight percent, referred to the total weight of the polymerizate present in the polymerizate seed latex and of the total quantity of the monomer to be polymerized—of emulsifier together with seed latex are available.

The term "monomer to be polymerized" denotes the monomers which are polymerized in the presence of the polymerizate seed latex.

Contrary to already known methods for the polymerization and copolymerization of vinyl chloride in an aqueous emulsion using a polymerizate seed latex, our process, beside the advantages mentioned above, has the further advantage that the chance of dosage errors in the quantities of emulsifiers is lessened, which results in lower requirements for personnel and equipment.

DESCRIPTION OF THE PREFERRED EMBODIMENTS

In using our process for the copolymerization of vinyl chloride, all monomers can be used which are otherwise copolymerizable in the known manner. Preferred as copolymerizable monomers with vinyl chloride are those which contain only one polymerizable group, namely the group

Here are some examples: vinylidene chloride, vinyl esters of carboxylic acids like vinyl formate, vinyl acetate, vinyl laurate and vinyl benzoate, acrylic esters and methacrylic esters like methyl acrylate and methyl methacrylate, as well as unsaturated dicarboxylic acids like maleic acid, fumaric acid, methylene malonic acid, itaconic acid, citraconic acid or tetrahydrophthalic acid, and the mono and di-esters of these acids like maleic acid dimethyl ester, -diethyl ester and -di-n-butyl ester, maleic acid mono-(2-ethylhexyl-) ester, fumaric acid dimethyl ester, -diethyl ester, -di-n-butyl ester, -di-(2-ethylhexyl-) ester and -dilauryl ester. Naturally, according to our process one can also make copolymerizates of more than two monomers, e.g. copolymerizates of 86 weight percent vinyl chloride, 13 weight percent vinyl acetate and 1 weight percent maleic acid anhydride.

All compounds that can be used as catalysts in the polymerization and copolymerization of vinyl chloride in an aqueous emulsion can also be used in our process. Most frequently these are water-soluble substances which yield radicals, particularly peroxide compounds like hydrogen peroxide, persulfates and perborates. Occasionally one can also use monomer-soluble radical components instead of or in conjunction with water-soluble radical components; this is mostly done in redoxy systems. Catalysts which can be used for polymerization and copolymerization of vinyl chloride in aqueous emulsion are described, for instance, in Bovey, Kolthoff, Medalia and Meehan "Emulsion Polymerization," New York, 1955, pages 59 to 93.

The catalysts are preferably used in quantities of 0.01 to 5 weight percent, particularly 0.02 to 1 weight percent, each time referred to the weight quantity of the monomer to be polymerized. Preferred in our process are water-soluble compounds as catalysts which yield radicals.

The polymerizate seed latex is preferably used in quantities of 1 to 10 weight percent, preferably 2 to 5 weight percent, each time referred to the weight quantities of the monomer(s) to be polymerized. Preferably the polymerizate seed latex is made of the same monomers in the same or practically the same quantity proportions as the monomers to the polymerized. The polymerizate seed latex can be made by any desired method for the polymerization and copolymerization of vinyl chloride in aqueous emulsion; but preference is given to water-soluble salts of aliphatic saturated monocarboxylic acids which are branched in alpha position to the carboxyl group and have at least 8 carbon atoms per molecule—as emulsifiers.

The monocarboxylic acids from which the anions are derived in the salts which according to our process are used as emulsifiers, can also be termed saturated aliphatic monocarboxylic acids in which the carboxyl group is bound directly to a tertiary or quaternary carbon atom. they can be represented by the general formula

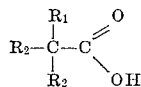

In this formula, the residues $R_1$ and $R_2$ represent alkyl, aryl or aralkyl groups and $R_3$ is an alkyl, aryl or aralkyl group or a hydrogen atom. The residues $R_1$, $R_2$ and $R_3$ or two of these residues can be joined together into rings. The alkyl groups can be linear, branched or cyclic, respectively. It is useful for the monocarboxylic acid from which the anions derive in the salts that are used as emulsifiers according to our process to contain at least 11 and not more than 28 carbon atoms, particular 15 to 19 carbon atoms, per molecule. For making the salts that are used as emulsifiers according to our process one can use mixtures of various branched carboxylic acids.

The monocarboxylic acids from which the anions derive in the salts that are used as emulsifiers according to our process, are known compounds. For instance, they can be made by the conversion of mono-olefines with carbon monoxide and water in the presence of acid catalysts like boron trifluoride. Mixtures of various branched carboxylic acids from which one can make salts that are used as emulsifiers according to our process, are commerically available, e.g. under the name "Versatic 911" and "Versatic 1519." (The name "Versatic" is a registered trademark.)

By neutralizing the aliphatic saturated monocarboxylic acids which are branched in alpha position to the carboxyl group and contain at least 8 carbon atoms per molecule, for instance with alkali metal hydroxides and/or ammonium hydroxide and/or with organic bases like triethanolamine, these carboxylic acids can be converted into the salts which are used as emulsifiers according to our process. Due to easier handling, this neutralization is preferably done in the polymerization vessel and perhaps during the polymerization; but if desired, aqueous solutions of the ready-made salts can also be introduced into the polymerization vessel.

The total quantity of water-soluble salts of aliphatic saturated monocarboxylic acids which are branched in alpha position to the carboxyl group and contain at least 8 carbon atoms per molecule, i.e. the total of the quantity of these salts which is available at the beginning of the polymerization of the monomer(s) to be polymerized in the presence of the seed latex, together with the seed latex, and the quantity of these salts which might be introduced during the polymerization into the polymerization vessel in addition or which might be created there, is preferably 0.1 to 5 weight percent, referred to the total weight of the polymerizate present in the polymerizate seed latex and the total quantity of the monomer to be polymerized. The weight proportion between monomer and water is not decisive. It is usefully in the range of 3:1 to 1:2, preferably in the range of 2:1 to 1:1.5.

The polymerization can occur at temperatures which are customary for processes for the polymerization and copolymerization of vinyl chloride, i.e. within the range of —20° C. to 100° C., preferably from 25 to 70° C.

The 0.1 to 1 weight percent, referred to the total weight of the polymerizate available in the polymerizate seed latex and of the total quantity of the monomer to be polymerized—of emulsifier which according to the invention is available at the beginning of the polymerization of the monomer(s) to be polymerized in the presence of the polymerizate seed latex together with the polymerizate seed latex, represent at least about 1000 weight percent of the quantity necessary to cover the entire surface of the polymerizate seed latex particles in a monomolecular layer. The 0.1 to 1 weight percent, referred to the total weight of the polymerizate available in the polymerizate seed latex and of the total quantity of the monomer to be polymerized—as emulsifier, which according to the invention is available at the beginning of the polymerization of the monomer(s) to be polymerized in the presence of the polymerizate seed latex together with the polymerizate seed latex, represent the sum total of the quantity of emulsifier which is already contained in the seed latex from its production, and of a quantity of emulsifier which was added to the seed latex before the beginning of the polymerization of the monomer(s) to be polymerized.

Particularly essential to the process of the invention is the use of the above-mentioned salts of branched carboxylic acids as emulsifiers in connection with the use of an emulsifier excess during the known use of polymerizate seed latex during the polymerization and copolymerization of vinyl chloride in an aqueous emulsion. Apart from these measures essential to our process one can use all possible measures for polymerizing and copolymerizing vinyl chloride in an aqueous emulsion, particularly with regard to temperature, pressure and movement of the polymerization ingredients; if desired, one can also employ customary additives, in addition to those named, during polymerization, like buffer substances and hydrocarbons, as well as regulators, e.g. chlorinated hydrocarbons.

From the polymerizate dispersions obtained according to our invention one can produce the polymerizates in the known manner, e.g. by rolling or spray drying.

From the polymerizates produced according to the invention, one can make plastisols and organosols in the known manner by grinding up with softeners, perhaps by including insoluble or slightly soluble or swelling organic volatile and/or non-volatile thinners. One can include with these the customary additives to plastisols and organosols, like stabilizers, e.g. barium-cadmium soaps, pigments, dyes and fillers.

For softeners one can use all monomer and polymer compounds which are customarily used as softeners for polyvinyl chloride and its copolymerizates (see H. Gnamm–W. Sommer, "Die Lösungsmittel und Weichmachungsmittel" ("The Solvents and Softeners"), Stuttgart 1958, pages 589 and 735). Preferred are completely esterified di- and tri-carboxylic acids, as well as completely esterified polyvalent inorganic acids like di-n-butyl phthalate, di-2-ethylhexyl phthalate, diethyl sebacate, triethyl citrate or tricresyl phosphate.

In plastisols the softeners are most frequently used in quantities from 15 to 200 weight percent, preferably from 15 to 100 weight percent, each time referred to the weight of the polymers.

As is known, for the manufacture of organosols one uses beside 10 to 50 weight percent of softeners, 10 to 50 weight percent, each time referred to the weight of the polymers, of non-volatile, insoluble or slightly soluble and swelling organic thinners. In addition one can use volatile thinners in any desired quantity, because due to their volatility they are no longer present in the finished products made from the organosols. Such an organosol may contain, for instance, high-boiling esters as disclosed in German Pat. #918,659, for softeners, petroleum extracts with a boiling point of above 125° C./1 mm. Hg (abs.) as non-volatile thinner and hydrocarbons boiling in the range from 35 to 250° C. as volatile thinners.

The dispersions made with the mixtures of our invention can be applied to tissues in the known manner, e.g. by painting on, spraying on, dipping or smearing on, and can be used for making cast shapes and foam rubber.

If desired, the polymerizates of our invention can also be processed in the known manner thermoplastically, i.e. by using heat and pressure, e.g. by calendering, extruding, spray-casting or pressing with or without softeners.

The viscosity data shown below were determined in each case with the Brookfield viscosimeter (see Bowles and coworkers in "Modern Plastics," volume 33, 1955, page 144), at 20 r.p.m., and the flow characteristics were determined in each case with the Severs extrusion rheometer (see e.g. Werner in "Modern Plastics," volume 34, 1957, page 137).

EXAMPLE 1

(a) The making of the polymerizate seed latex

Into a mixing autoclave lined with refined steel we put 130 kg. water, 50 g. potassium persulfate, 500 g. of a mixture of aliphatic saturated monocarboxylic acids branched in the alpha position to the carboxyl group and with 15 to 19 carbon atoms per molecule, produced in the manner described in Canadian Pat. #673,595, page 11, and commercially available under the name "Versatic 1519," and 15 g. sodium hydroxide. After the air has been evacuated from the autoclave 20 kg. of vinyl chloride are pumped into the autoclave. Then the contents of the autoclave are heated to 54° C. while being stirred, and kept at this temperature under stirring until the end of the polymerization. After the pressure has started to drop (about 4 hours after the temperature of 54° C. has been reached) 80 kg. of vinyl chloride and separately therefrom a solution of 60 g. sodium hydroxide in 5 kg. water, are pumped in over a period of 16 hours in uniform streams.

(b) Polymerization according to the invention, using the polymerization seed latex Into a mixing autoclave lined with refined steel we place 130 kg. water, 5 kg. of the polymerizate dispersion obtained in accordance with (a) above, as the polymerizate seed latex, 1 kg. of the mixture of carboxylic acids described in (a), 50 g. potassium persulfate and 30 g. sodium hydroxide. After the air has been evacuated from the autoclave, 20 kg. vinyl chloride are pumped into the autoclave. Then the contents of the autoclave are heated to 54° C. while stirring, and the temperature and the stirring are maintained until the end of the polymerization. After the pressure has started to drop, 80 kg. vinyl chloride and separately therefrom a solution of 120 g. sodium hydroxide in 5 kg. water are pumped in over a period of 16 hours in uniform streams. After completion of the polymerization and after the unconverted monomers have been blown off, the stable polymerizate dispersion is spray-dried.

A paste of 100 weight parts of the polymerizate obtained in this manner and of 65 weight parts of di-2-ethylhexyl phthalate (DOP) has a viscosity of 2,800 cp./25° C. and Newtonian flow characteristics.

EXAMPLE 2

Into a mixing autoclave lined with refined steel we place 130 kg. water, 3 kg. of the polymerizate dispersion obtained as per Example 1(a) as the polymerizate seed latex, 0.5 kg. of the mixture of carboxylic acids described in Example 1(a), 80 g. potassium persulfate and 40 g. sodium hydroxide. After evacuation of the air from the autoclave 20 kg. of vinyl chloride are pumped into the autoclave. Then the contents of the autoclave are stirred and heated to 45° C. and the stirring and this temperature are maintained until the end of the polymerization. After the pressure has started to fall, 80 kg. vinyl chloride and separately therefrom a solution of 30 g. sodium hydroxide in 3 kg. water are pumped in over a period of 16 hours in uniform streams. After completed polymerization and after the unconverted monomers have been blown off, the polymerizate dispersion is spray-dried.

A paste of 60 weight parts of the polymerizate obtained in this manner and 40 weight parts of DOP has a viscosity of 3,500 cp./25° C. and has Newtonian flow characteristics.

EXAMPLE 3

Into a mixing autoclave lined with refined steel we place 130 kg. water, 3 kg. of a polymerizate dispersion produced as described in Example 1(a), but with the exception that instead of the vinyl chloride a mixture of 90 weight parts vinyl chloride and 10 weight parts vinyl acetate was used, as the polymerizate seed latex, 0.5 kg. of the mixture of carboxylic acids described in Example 1(a), 50 g. potassium persulfate, 15 g. sodium hydroxide and 2 g. vinyl acetate. After evacuation of the air from the autoclave, 18 kg. vinyl chloride are pumped into the autoclave. Then the contents of the autoclave are stirred and heated to 54° C., and the stirring as well as the temperature is maintained until the end of the polymerization. After the pressure has started to fall, a mixture of 72 kg. vinyl chloride and 8 kg. vinyl acetate, and separately therefrom a solution of 60 g. sodium hydroxide in 5 kg. water are pumped in over a period of 16 hours in uniform flows. After the polymerization is completed and the untransformed monomers have been blown off, the polymerization dispersion is spray-dried.

We obtain a copolymerizate which after being ground up with a softener yields a low-viscous paste with Newtonian flow characteristics.

Comparative test (a)

Into a mixing autoclave lined with refined steel we place 130 kg. water, 100 g. sodium salt of the mixture of carboxylic acids described in Example 1(a), and 50 g. potassium persulfate. After the air has been withdrawn from the autoclave, 20 kg. vinyl chloride are pumped into the autoclave. Then the contents of the autoclave were heated to 54° C. under stirring and kept at this temperature under stirring until the end of the polymerization. After the pressure began to drop, 80 kg. vinyl chloride, and separately therefrom 8 kg. of a 5 weight percent aqueous solution of sodium salt of the mixture of carboxylic acids described in Example 1(a), were pumped in over a period of 16 hours in uniform streams. After the polymerization was completed and the untransformed monomers had been blown off, the polymerizate dispersion was spray-dried.

A paste of 100 weight parts of the polymerizate obtained in this manner and of 65 weight parts of DOP has a viscosity of 30,000 cp./25° C. and a dilating flow characteristic.

Comparative test (b)

A polymerizate dispersion, produced as described in Example 1(a) was spray-dried. The result was a polymerizate which yielded a paste which has practically the same paste properties as shown in comparative test (a).

Comparative test (c)

The same work method was followed as described in Example 1(b), with the exception that the 30 g. sodium hydroxide which had been placed in before the beginning of the polymerization were left out, so that no more of the emulsifier was present than necessary to completely cover the surface of the already existing polymerizate particles in a monomolecular layer. An undesirable coagulation of the polymerizate dispersion was observed.

Comparative test (d)

The same work method was followed as described in Example 1(b), with the exception that before the beginning of the polymerization not 30 g. of sodium hydroxide but 10 g. of sodium hydroxide were placed in. There too an undesirable coagulation of the polymerizate dispersion was observed.

The invention claimed is:

1. Process for polymerizing and copolymerizing vinyl chloride in aqueous emulsion with a polymerizate seed latex and in the presence of water-soluble salts of saturated monocarboxylic acids which are branched in alpha position to the carboxyl group and contain at least 8 carbon atoms to the molecule, said acids being made by the conversion of mono-olefins with carbon monoxide and water in the presence of acid catalysts, as emulsifiers, characterised by the fact that, at the beginning of the polymerization of the monomer(s) to be polymerized in the presence of said polymerizate seed latex, 0.1 to 1 weight percent, referred to the total weight of the polymerizate available in the polymerizate seed latex and of the total quantity of the monomer to be polymerized, of emulsifier together with the seed latex are present.

2. Process according to claim 1, in which as emulsifiers there are employed water-soluble salts of aliphatic saturated monocarboxylic acids which are branched in alpha position to the carboxyl group and which have 15 to 19 carbon atoms per molecule.

References Cited

UNITED STATES PATENTS

| | | | |
|---|---|---|---|
| 2,771,457 | 11/1956 | Barnes et al. | 260—92.8 W |
| 3,342,765 | 9/1967 | Oosterhof | 260—23 |

OTHER REFERENCES

Smith, M. W.: Vinyl Resins, Reinhold Plastics Applications Series, Reinhold Publishing Corporation, 1958, pp. 96–98.

JAMES A. SEIDLECK, Primary Examiner

J. A. DONAHUE, Jr., Assistant Examiner

U.S. Cl. X.R.

260—29.6, 31.8 R, 78.5 CL, 80.8, 86.3, 87.1, 87.7, 92.8 W